United States Patent
Wang et al.

(10) Patent No.: US 6,297,279 B1
(45) Date of Patent: *Oct. 2, 2001

(54) LIPID COMPOSITION FOR INFANT FORMULA AND METHOD OF PREPARATION

(75) Inventors: Junkuan Wang, Lausanne; Raymond Bertholet, Blonay; Pierre Ducret, St. Saphorin/Morges; Mathilde Fleith, La Tour-de-Peilz, all of (CH)

(73) Assignee: Nestac S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/484,791

(22) Filed: Jan. 18, 2000

Related U.S. Application Data

(63) Continuation-in-part of application No. 09/114,318, filed on Jul. 13, 1998, now Pat. No. 6,034,130.

(30) Foreign Application Priority Data

Jul. 22, 1997 (EP) .................................................. 97202289

(51) Int. Cl.⁷ .................................................... A61K 31/20
(52) U.S. Cl. ............................................. 514/560; 514/558
(58) Field of Search ............................... 514/558, 45, 78, 514/560; 426/601, 602

(56) References Cited

U.S. PATENT DOCUMENTS 4,670,285 * 6/1987 Clandinin et al. .
5,709,888 * 1/1998 Gil et al. .
5,747,434 * 5/1998 Lamsaet et al. .

FOREIGN PATENT DOCUMENTS

0209327-A * 1/1987 (EP) .
WO-94/26854-A * 11/1994 (WO) .
WO-94/26855-A * 11/1994 (WO) .

* cited by examiner

Primary Examiner—William R. A. Jarvis
Assistant Examiner—Vickie Kim
(74) Attorney, Agent, or Firm—Winston & Strawn

(57) ABSTRACT

A method for preparing a synthetic lipid composition in which the content and the distribution of the fatty acids are similar to those of human milk fat, containing less than 2% by weight of free fatty acids, in which palmitic acid is predominantly at the 2-position of the triacylglycerols and the arachidonic and docosahexaenoic acids are distributed between the 1-, 2- and 3-position and in particular predominantly at the 2-position of the triacylglycerols. The method includes the steps of interesterifying a mixture of specific lipids with a mixture of free fatty acids, followed by removal of excess free fatty acids by partial deacidification utilizing steam distillation under vacuum and then by controlled neutralization of the partially deacidified fat.

17 Claims, No Drawings

LIPID COMPOSITION FOR INFANT FORMULA AND METHOD OF PREPARATION

CROSS REFERENCE TO RELATED APPLICATIONS

This is a continuation-in-part of application Ser. No. 09/114,318 filed Jul. 13, 1998 now U.S. Pat. No. 6,034,130.

BACKGROUND ART

The invention relates to the field of dietetic lipids, in particular for infant formulas. It relates to a lipid composition which mimics that of human milk.

Human milk fat is composed essentially of triacylglycerols (TAGs) whose fatty acid structure, composition and distribution are specific. It is characterized in particular by the presence of two long-chain polyunsaturated fatty acids (LC-PUFA), arachidonic acid (AA, C20:4, n-6) and docosahexaenoic acid (DHA, C22:6, n-3) predominantly at the 2-position of the triacylglycerol, by the abundance of saturated (SFA) palmitic acid. (P, C16:0) and by the fact that P is predominantly at the 2-position of the triacylglycerol.

Lipid compositions for infant formulas which mimic human milk fat as well as processes for the preparation of such compositions are described in patent EP-B-209327 and in patent applications WO 94/26855 (POT/EP 94/01306) and WO 94/26854 (POT/EP 94/01304). These compositions comprise a mixture of TAGs in which more than 50% of the fatty acids at the 2-position of the triacylglycerol are SFAs, predominantly P, and where the fatty acids at the 1,3-positions of the triacylglycerol comprise medium-chain $C_8$–$C_{14}$ unsaturated fatty acids (MCFA).

The process for preparing these compositions, which is described in EP-B-209327, consists in an interesterification, catalysed by a 1,3-regiospecific lipase of a mixture consisting, on the one hand, of a palm oil fraction comprising 80% of tristearin and 20% of 1,3-dipalmitoyl-2-olein and, on the other hand, of a mixture of free fatty acids containing a substantial quantity of unsaturated fatty acids. Under the action of the 1,3-regiospecific lipase, medium-chain saturated fatty acid residues are introduced at the 1,3-positions of the 2-palmitoyl-glycerides. The free fatty acids of the crude mixture are then removed by steam distillation. The mixture of synthetic TAGs produced is finally mixed with various vegetable oils.

In WO 94/26855, the above mixture of synthetic TAGs, mixed with various vegetable oils in defined portions, is subjected to an interesterification using a 1,3-regiospecific lipase.

In WO 94/26854, where appropriate, after removal of the diglycerides by enzymatic treatment, the trisaturated TAGs are partially removed from the above mixture of synthetic TAGs by interesterification using a 1,3-regiospecific lipase in the presence of an oil which is high in mono- or diunsaturated acids.

The known processes have disadvantages.

Since most of the customary lipases have a low reactivity towards polyunsaturated fatty acids (PUFAs), particularly towards the LC-PUFAs, it is very difficult to incorporate the desired quantities of these fatty acids, in particular of DHA into the TAGs using a 1,3-regiospecific lipase. Thus, to achieve an appreciable degree of incorporation, it is necessary to use a large excess of fatty acid, for example in concentrated form, and a long reaction time. Concentrates of PUFAs are very expensive. The long reaction time can cause significant oxidation of the PUFAs which are particularly sensitive to oxidation when they are in the form of free fatty acids. Such an oxidation reduces the nutritional value of the PUFAs and may produce degradation compounds which are health hazards.

Furthermore, the use of 1,3-regiospecific lipase produces trisaturated TAGS in excess and also diglycerides. Subsequent enzymatic treatments are required, in particular to remove the trisaturated TAGs in excess from the crude product, which makes the process complicated and expensive.

Finally, the lipid mixture obtained must, in spite of everything, be mixed with other fats in order to correspond to the composition of human milk fat.

SUMMARY OF THE INVENTION

The aim of the invention is to provide a synthetic TAG composition whose composition and structure are close to those of human milk, using a synthesized process for incorporating PUFAs which does not cause significant destructive oxidation of the PUFAs.

The invention therefore relates to a synthetic lipid composition in which the content and the distribution of the fatty acids which mimic those of human milk fat, characterized in that:

it contains less than 2% by weight of free fatty acids,
the fatty acids of the triacylglycerols comprise, by weight:
about 35 to 55% of saturated fatty acids, among which 18 to 36% of palmitic acid, 2 to 40% of caprylic and capric acids, at most 10% of lauric acid and at most 10% of myristic acid,
about 30 to 45% of monounsaturated fatty acids,
about 9 to 22% of polyunsaturated fatty acids, among which less than 2% of long-chain n-6 polyunsaturated fatty acids comprising arachidonic acid and less than 1% of long-chain n-3 poly-unsaturated fatty acids comprising docosahexaenoic acid and the n-6:n-3 fatty acid ratio is 5:1 to 15:1,
palmitic acid is predominantly at the 2-position of the triacylglycerols and arachidonic and docosahexaenoic acids are distributed between the 1-, 2-and 3-positions of the triacylglycerols.

The AA and DHA acids may be predominantly at the 2-position of the triacylglycerols.

Since it is more specifically intended for consumption by premature babies, the lipid composition according to the invention is such that the caprylic and capric acids preferably represent about 2 to 10% by weight of the fatty acids of the triacylglycerols.

The invention also relates to a process for the preparation of a lipid composition above, characterized by the following successive steps:

1) A mixture of lipids containing a palm oil enriched with palmitic acid, a vegetable oil high in the unsaturated linoleic and alpha-linolenic fatty acids, an oil which is the source of arachidonic acid, an oil which is the source of docosahexaenoic acid, in defined proportions, is non-regio-specifically interesterified in order to obtain the required fatty acid composition with a random distribution of the fatty acid residues between the 1-, 2- and 3-positions of the triacylglycerol, 2) The mixture of step 1) is interesterified with a mixture of free fatty acids predominantly comprising the medium-chain fatty acids and oleic acid, using a 1,3-regiospecific lipase, and 3) The free fatty acids are removed from the product of the reaction of step 2).

DETAILED DESCRIPTION OF THE PREFERRED EMBODIMENTS

The aim of step 1) is to increase the quantity of P at the 2-position of the TAGs and to incorporate the PUFAs, in particular the LC-PUFAs such as DHA and AA at the 1-, 2- and 3-positions of the TAGs. The starting lipid m4mixture is enriched with palmitic acid, for example with palm stearin so as to have about 40% of P at the 2-position of the TAGs. The non-regiospecific interesterification can take place by the enzymatic route, catalysed by a non-regiospecific lipase, or, preferably by the chemical route, catalysed by a chemical catalyst. By this reaction, the non-random distribution of the fatty acids existing in the natural lipids between the different positions of the TAGs is converted to a random distribution, that is to say that the fatty acids become rearranged equally at the 3 positions. In this first step, the content of P at the 2-position passes to about 42%, which practically corresponds to the entire P present in human milk. If the one at the 1- and 3-positions is taken into account, an excess of P therefore exists compared with human milk.

The PUFA fatty acids, and particularly the LC-PUFAs, undergo the rearrangement reaction in the form of TAGs, which are more stable than mixtures of free fatty acids and with a limited reaction time, at a relatively low temperature and under an inert atmosphere, for example under nitrogen. On the other hand, according to the state of the art, the mixtures of fatty acids intended to serve as lipolysis substrate should first be prepared, which can also cause, in part, their degradation by oxidation.

The lipid mixture which results from the reaction has a significantly improved oxidative stability compared with that of a simple physical mixture of lipids of the same PUFA fatty acid composition. This probably results from the PUFA fatty acid distribution between the various positions of the TAGs.

The aim of step 2) is to selectively replace the P at the 1- and 3-positions with other fatty acids, in particular with MCFAs and oleic acid (O), but not with the PUFAs. To do this, advantage is taken of kinetic resolution, that is to say of the fact that most of the 1,3-regiospecific lipases, genetically modified or otherwise, for example from Mucor miehei, and Candida cylindracea, and pancreatic lipase, react preferentially for example towards MCFAs, P and O, and in a discriminatory manner towards the LC-PUFAs containing 4, 5 and 6 double bonds, for example DHA and AA. In this manner, the excess P is rapidly exchanged, leaving the PUFAs, in particular DHA practically intact at the 1- and 3-positions.

It is observed that after subsequent separation of the free fatty acids, the oxidative stability of the TAGs of the mixture derived from step 2 is maintained or even improved.

After the second step of the process according to the invention, it is necessary to remove the free fatty acids in excess as well as those formed during the exchange process which may be subject to oxidation. To do this, it is possible to use any known method such as, for example, conventional neutralization or steam distillation under vacuum.

This third step is preferably carried out by performing a controlled neutralization of the free fatty acids and therefore a selective refining, minimizing hydrolysis and saponification. The principle of this selective refining is to carry out the operation in an aqueous-alcoholic phase, with gentle stirring, which leads to partition of the free fatty acids between the lipid phase and the aqueous-alcoholic phase which is immiscible with the lipid phase, while a base, for example a concentrated aqueous NaOH or KOH solution, is gradually added to the aqueous-alcoholic phase, for example by means of a pH-stat regulated at a set point, for example about 9.5. Soaps are formed which are solubilized as they are produced in the aqueous-alcoholic phase, which produces a shift in the equilibrium and a progressive deacidification of the lipid phase. The pH chosen minimizes neutralization of the phenolic derivatives. The reaction temperature chosen is greater than the melting point of the lipids and is less than the boiling point of the aqueous-alcoholic mixture. When all the fatty acids have been extracted, the pH is stabilized, indicating the end of the reaction. After neutralization, the two phases are separated by decantation and the deacidified lipid phase is recovered, from which the ethanol is removed, for example by evaporation under vacuum and the residual soaps are removed, for example by washing with an aqueous-ethanolic solution or by treating with an adsorbent, in particular an amorphous silica gel.

The invention also relates to an infant food containing proteins, where appropriate hydrolysed, carbohydrates, lipids and where appropriate vitamins and trace elements, characterized in that it contains, by weight of dry matter, 15 to 35% of lipids of which 50 to 100% consist of the above lipid composition.

Such an infant food can be prepared in liquid or powdered form with incorporation of the above lipid composition, by wet mixing of the various constituents, followed by sterilization or pasteurization and aseptic packaging in the case of a liquid product or by drying, for example by spray-drying or by dry mixing in the case of a powder.

EXAMPLES

The examples below illustrate the invention. In these, the parts and percentages are by weight, unless otherwise indicated.

Example 1

1.1) Chemical Interesterification

A mixture of lipids, the nature and composition of which are indicated in Table 1 below, is used as starting material:

TABLE 1

| Oil/fat | Mixture (%) | Origin | Characteristics |
| --- | --- | --- | --- |
| Fish oil | 2 | Nippon Suisan Kaisha | high in DHA |
| Oil source of AA | 1 | Gist-Brocades | AA, 37% (oil from a unicellular organism) |
| Soya bean oil | 10 | commercial | source of ALA |
| Palm stearin | 5 | Loders Croklaan | P, 75% |
| Palm oil | 82 | Morgia | source of P |

The above lipid mixture containing 24 g of fish oil (with 24.6% of DHA and 6.4% of EPA), 12 g of oil which is the source of AA (containing 37% of AA), 60 g of palm stearin (containing 75% of P), 984 g of palm oil and 120 g of soya bean oil (containing LA and ALA) is randomly interesterified in the presence of 0.5% of sodium methoxide as catalyst at 50°C., with continuous stirring, under a nitrogen atmosphere for 4 h. The reaction mixture is then washed with 2 l of hot water in order to remove the soaps, and then it is dried at 50° C. under a 20 mbar vacuum.

To avoid oxidation, a small quantity of sodium salt of ethylenediaminetetraacetic acid (EDTA-NA$_3$) may be added thereto.

1.2) 1,3-regiospecific Enzymatic Acidolysis

The acidolysis is a rearrangement, catalysed by a 1,3-regiospecific lipase, of a mixture consisting of the product of the preceding step 1 and of a mixture of fatty acids whose composition is indicated in Table 2 below:

TABLE 2

| Fatty acid | % |
|---|---|
| C8:0 | 10 |
| C10:0 | 15 |
| C12:0 | 10 |
| C14:0 | 1.6 |
| C16:0 | 3 |
| C16:1 | 3.2 |
| C18:0 | 1.7 |
| C18:1 | 45 |
| C18:2 | 6.3 |
| C18:3 (alpha) | 0.3 |
| Others | 3.9 |

940 g of the product of the preceding step 1 and 940 g of the mixture of commercial oleic acid and of the C$_{8-12}$:0 acids having the composition indicated in the above Table 2, are subjected to interesterification catalysed by an immobilized 1,3-regiospecific lipase (Lipozyme IM 60®, Novo) in an amount of 10% of lipase relative to the substrates. The water content of the lipase is adjusted by adding 6% water and by allowing it to stand for 10 h before using it. The reaction is then carried out at 40° C. under a nitrogen atmosphere for 5 h. After reacting, the lipase is separated by filtration and a crude mixture containing TAGs and free fatty acids is recovered.

1.3) Controlled Neutralization in Order to Remove the Free Fatty Acids 1.4 kg of the crude mixture of the preceding step and 3.5 1 of 90% ethanol are introduced into a reactor and stirred gently at 40° C. under a nitrogen atmosphere. 670 g of a 25% aqueous KOH solution are continuously added thereto while maintaining the pH of the reaction medium between 8.5 and 9.5 by means of a pH-stat regulated at the set point of 9.5. Soaps are formed which are solubilized as they are formed in the aqueous-alcoholic phase which is immiscible with the lipid phase, producing a shift in the equilibrium for partition of the fatty acids between the lipid phase and the aqueous-alcoholic phase towards the aqueous-alcoholic phase, and as a result a progressive deacidification of the lipid phase. The pH is stabilized, indicating that all the fatty acids have been extracted. The stirring is then stopped; the aqueous-alcoholic phase, which is lighter, separates from the lipid phase and the lipid phase is recovered.

The composition of the fatty acids in the product obtained is determined by gas-liquid chromatography of the methyl esters of the acids after methylation of the triglycerides (FAMES).

To determine the distribution of the fatty acids between the 2-position and the 1,3-positions of the TAGs, lipolysis is carried out with pancreatic lipase (IUPAC 2.210).

The results of the analysis of the principle fatty acids and of their distribution in the mixture obtained are indicated in Table 3 below:

TABLE 3

| Fatty acid (fames) | Fatty acids as % of the total (fames) | Fatty acids at the 2-position of the TAGs (%, analysed) | Fatty acids at the 1,3-positions of the TAGs (%, calculated) |
|---|---|---|---|
| C8:0 | 3.07 | 0.06 | 4.56 |
| C10:0 | 5.08 | 0.21 | 7.48 |
| C12:0 | 4.04 | 0.39 | 5.83 |
| C14:0 | 1.2 | 1.03 | 1.28 |
| C16:0 | 28.13 | 40.86 | 21.88 |
| C18:0 | 3.33 | 4.62 | 2.7 |
| C18:1 | 37.83 | 34.1 | 39.66 |
| C18:2 | 10.93 | 12.57 | 10.12 |
| C18:3, n-3 (alpha) | 0.56 | 0.6 | 0.54 |
| C20:4, n-6 (AA) | 0.26 | 0.34 | 0.22 |
| C20:5, n-3 (EPA) | 0.18 | 0.2 | 0.17 |
| C22:6, n-3 (DHA) | 0.42 | 0.35 | 0.46 |
| Others | 4.97 | 4.67 | 5.1 |

It is observed that the composition of the fatty acids as well as their distribution on the TAGs is very similar to those-of human milk.

Furthermore, the oxidative stability (OSI) of the product obtained, measured in the accelerated oxidation test with the Omnion (R) apparatus, USA, as period of induction at 80° C. with an air flow rate of 150 ml/min, corresponds to an index of about 160 h, that is to say about 1.5–2 times higher than that of 100 h measured for the starting mixture of lipids.

The solids content of the fat, determined by pulsed nucleomagnetic resonance (NMR, IUPAC 2.150 6.2.2.2) is the following:

Solids content (%) at the temperature ( ° C.) indicated
N-5 40.3
N-10 29.9
N-15 19
N-20 10.4
N-30 1.2
N-35 0

The preceding result shows that there is no significant quantity of undesirable trisaturated TAGs.

Example 2

The procedure is carried out as in Example 1, step 1), except that the composition of the starting lipid mixture is that indicated in Table 4 below:

TABLE 4

| Oil/fat | Mixture (%) | Origin | Characteristics |
|---|---|---|---|
| Fish oil | 2 | Nippon Suisan Kaisha | high in DHA |
| Oil source of AA | 1.5 | Gist-Brocades | AA, 37% (oil from a unicellular organism) |
| Soya bean oil | 15 | commercial | source of ALA |
| Palm oil | 81.5 | Morgia | source of P |

The enzymatic interesterification is then carried out as in Example 1, step 2), except that the composition of the mixture of the free fatty acids is as defined in Table 5 below and that the TAGs/mixture of fatty acids ratio is 70:30.

TABLE 5

| Fatty acid | % |
|---|---|
| C10:0 | 12 |
| C12:0 | 15 |
| C14:0 | 6.7 |

TABLE 5-continued

| Fatty acid | % |
|---|---|
| C16:0 | 3.2 |
| C16:1 | 3.5 |
| C18:0 | 1.8 |
| C18:1 | 48.6 |
| C18:2 | 6.7 |
| C18:3 (alpha) | 0.3 |
| Others | 2.2 |

The result of the analysis of the principle fatty acids and of their distribution in the mixture obtained are indicated in Table 6 below:

TABLE 6

| Fatty acid (fames) | Fatty acids as % of the total (fames) |
|---|---|
| C10:0 | 2.89 |
| C12:0 | 4.04 |
| C14:0 | 2.32 |
| C16:0 | 28.84 |
| C18:0 | 4.62 |
| C18:1 | 38.65 |
| C18:2 | 13.23 |
| C18:3, n-3 (alpha) | 0.94 |
| C20:4, n-6 (AA) | 0.48 |
| C20:5, n-3 (EPA) | 0.21 |
| C22:6, n-3 (DHA) | 0.36 |
| Others | 3.42 |

It is observed that the composition of the fatty acids as well as their distribution on the TAGs is very similar to those of human milk fat.

Example 3

1.1) Chemical Interesterification 500 g of a blend composed of 80.5% palm oil, 17.65% palm stearin, 1.45% DHA-rich fish oil, and 0.45% AA single cell oil were dried at 85° C./25 mbar for 30 minutes with 1.0 g (0.2%) of sodium ethylate. The reaction mixture was then washed at 80° C. under $N_2$ with 100 g (10%) of water containing 5 g (1%) citric acid and 100 g of water. The fat was then treated with 5.0 g (1%) of adsorbent (Tonsil Optimum FF(TM)) at 85° C./25 mbar for 15 minutes and the adsorbent was removed by filtration. The chemically interesterified fat (487.5 g) obtained had an acid value (=mg KOH/g fat) of 3.1.

1.2) Enzymatical Acidolysis 700 g of a blend composed of 280 g (40%) of chemically esterified fat, 224 g (32%) of oleic acid C18:1, 84 g (12%) of caprylic acid C8:0, 112 g (16%) of capric acid C10:0 were heated at 50° C. under $N_2$ in a reaction vessel. This was followed by addition of 2.1 g (0.3%) of water and 70 g (10%) of immobilized lipase, Lipozyme TM (IM). The reaction was carried out for 5 hours at 50° C. The Lipozyme IM was then removed by filtration. The resulting mixture (601g) had an acid value of 161.

1.3) Deacidification

The acidity of the mixture was measured by titration during the deacidification procedure (see Table 8).

A. Deacidification by Steam Distillation

The mixture obtained after the enzymatical acidolysis (540 g) was introduced in a 1-liter laboratory deodorizer and subjected to steam distillation under a pressure of 1–2 mbar. The mixture was slowly heated up to 190° C. Free fatty acids were distilled and collected in the condenser. A first fraction (90 g) was collected between 100–150° C. and a second (134 g) between 150–190° C. The fatty acid composition of the two fractions were analyzed by GLC (see Table 7). 225 g of partially deacidified fat was obtained.

TABLE 7

| | Fatty acid composition (% weight) of the fractions collected in the condenser | | | | |
|---|---|---|---|---|---|
| Fraction collected at | C8:0 | C10:0 | C16:0 | C18:1 | C18:2 |
| 100–150° C. | 44.7 | 53.7 | 1.4 | 1.3 | — |
| 150–190° C. | — | 6.9 | 29.3 | 48.5 | 7.5 |

Note: The fraction collected at 100–150° C. can be recycled for the enzymatical acidolysis.

B. Deacidification by Neutralization 600 g of partially deacidified fat were mixed with 400 g of propylene glycol (PG) in a reaction vessel and heated to 75° C. under $N_2$. A pH electrode was placed into the mixture and a solution of 20% KOH (170g) was slowly added until the pH reached 10.0. The mixture was allowed to settle for 1 hour at 75° C. and the heavy phase (PG+soap+water) was removed by decantation. The upper phase was then washed three times with 100 ml (30%) of hot water. 188 g of crude structured fat were obtained.

1.4) Refining

The crude structured fat (400 g) was treated at 85° C. in a reaction vessel with 2 g (0.5%) of Trisyl for 5 minutes and 1 g (0.25%) of Tonsil Optimum for 20 minutes at 25 mbar. After filtration, 380 g of decolorized structured fat was obtained. The decolorized fat (300 g) was heated in a laboratory steam deodorizer at 190° C. for 3 hours. After cooling at 60° C. and filtering, 290 g of refined structured fat was obtained. The fat had neutral taste and odor and an acid value of 0.06.

TABLE 8

| | Acidity measured during the deacidification procedure | |
|---|---|---|
| Sample | acid value (mg KOH/g fat) | % (weight) Fatty Acid |
| Mixture before deacidification | 161 | 65 |
| Mixture after steam distillation at 100–150° C. | 115 | 55 |
| Mixture after steam distillation at 150–190° C. | 55 | 25 |
| Crude fat after neutralization | 1 | 0.5 |

What is claimed is:

1. Process for the preparation of a lipid composition characterized by the following successive steps:
   (a) a mixture of lipids containing a palm oil enriched with palmitic acid, a vegetable oil high in unsaturated linoleic and alpha linoleic fatty acids, an oil which is the source of arachidonic acid, and oil which is the source of docosahexanoic acid, in defined proportions, is non-regiospecific interesterified to obtain a fatty acid composition having a random distribution of fatty acid residues between the 1-, 2-, and 3-positions of triacylglycerol, (b) the composition of step (a) is interesterified with a mixture of free fatty acids predominantly comprising medium-chain fatty acids and oleic acid, using a 1,3-regiospecific lipase, and (c) excess free fatty acids are removed from the composition first by partial deacidification with steam distillation under vacuum, and then by controlled neutralization of the partially deacidified composition.

2. Process according to claim 1, wherein the interesterification of step (a) takes place by the chemical route with an effective quantity of a catalyst.

3. Process according to claim 2, wherein the catalyst is sodium methoxide and the interesterification of step (a) takes place at a temperature of less than 80° C. for at most 10 h under an inert atmosphere.

4. Process according to claim 1, wherein in step (c), the excess free fatty acids along with fatty acids formed during the interesterification are removed by neutralization or steam distillation under vacuum.

5. Process according to claim 1, wherein in step (c), the excess free fatty acids along with fatty acids formed during the interesterification are removed by controlled neutralization while minimizing hydrolysis and saponification, with the neutralization conducted in an aqueous-alcoholic phase, with gentle stirring, at a temperature greater than the melting point of the lipids in the composition, but less than the boiling point of the aqueous-alcoholic phase, to partition the free fatty acids between a lipid phase and an aqueous-alcoholic phase which is immiscible with the lipid phase, while gradually adding a base to the aqueous-alcoholic phase to adjust pH to a range of about 8.5 to 9.5, thus forming soaps which are solubilized in the aqueous-alcoholic phase, and producing a shift in equilibrium and a progressive deacidification of the lipid phase until the pH is stabilized when all the fatty acids have converted to soaps, such that after neutralization the two phases may be separated by decantation and the deacidified lipid phase recovered from which phase the alcohol and the residual soaps are removed.

6. Process according to claim 5, wherein the base is gradually added to aqueous-alcoholic phase by means of a pH-stat regulated at a set point ranging from 8.5 to 9.5.

7. Process according to claim 5, wherein the two phases are separated by decantation, and the alcohol is removed from the deacidified lipid phase by evaporation under vacuum.

8. Process according to claim 7, wherein residual soaps are removed by washing with an aqueous-ethanolic solution.

9. Process according to claim 7, wherein the residual soaps are removed by treatment with an adsorbent.

10. Process according to claim 9, wherein the adsorbent is amorphous silica gel.

11. Process according to claim 1, wherein in step (c) the free fatty acids as well as those formed during the interesterification are removed by neutralization.

12. Process for the preparation of a lipid composition which comprises: non-regiospecific interesterification of a first mixture of lipids to obtain a random distribution of fatty acid residues between the 1-, 2-, and 3- positions of triacylglycerol, to form a second mixture wherein the first mixture of lipids includes palm oil enriched with palmitic acid, a vegetable oil that is high in unsaturated linoleic or alpha linoleic fatty acids, an oil which is a source of arachidonic acid, and an oil which is a source of docosahexanoic acid;

interesterification of the second mixture with a mixture of free fatty acids predominantly comprising medium-chain fatty acids and oleic acid, using 1,3-regiospecific lipase to form a third mixture;

removing excess fatty acids of the third mixture to form a fourth mixture containing a partially deacidified fat; and neutralizing the partially deacidified fat in the fourth mixture to obtain the lipid composition.

13. Process according to claim 12, wherein the interesterification of the first mixture comprises a chemical treatment with a catalyst.

14. Process according to claim 13, wherein the catalyst is sodium methoxide and the interesterification of step (a) takes place at a temperature of less than 80° C. for at most 10 h under inert atmosphere.

15. Process according to claim 12, wherein the excess free fatty acids are removed by steam distillation or by neutralization.

16. Process according to claim 12, wherein in step (c), the excess free fatty acids along with fatty acids formed during the interesterification are removed by controlled neutralization while minimizing hydrolysis and saponification with the neutralization conducted in an aqueous-alcoholic phase, with gentle stirring, at a temperature greater than the melting point of the lipids in the composition, but less than the boiling point of the aqueous-alcoholic phase, to partition the free fatty acids between a lipid phase and an aqueous-alcoholic phase which is immiscible with the lipid phase, while gradually adding a base to the aqueous-alcoholic phase to adjust pH to a range of about 8.5 to 9.5, thus forming soaps which are solubilized in the aqueous-alcoholic phase, and producing a shift in equilibrium and a progressive deacidification of the lipid phase until the pH is stabilized when all the fatty acids have converted to soaps, such that after neutralization, the two phases may be separated by decantation and the deacidified lipid phase recovered from which phase the alcohol and the residual soaps are removed.

17. Process according to claim 16, wherein the excess fatty acids are removed by neutralization using a base to form residual soaps.

* * * * *

UNITED STATES PATENT AND TRADEMARK OFFICE
CERTIFICATE OF CORRECTION

PATENT NO. : 6,297,279 B1
DATED : October 2, 2001
INVENTOR(S) : Wang et al.

It is certified that error appears in the above-identified patent and that said Letters Patent is hereby corrected as shown below:

<u>Title page,</u>
Item "[73] Assignee": change "Nestac" to -- Nestec --.

Signed and Sealed this

Fifth Day of March, 2002

Attest:

JAMES E. ROGAN
*Attesting Officer*     *Director of the United States Patent and Trademark Office*